United States Patent [19]

Griffin

[11] 4,055,206
[45] Oct. 25, 1977

[54] COMPOSITE SHOP TRAILER

[76] Inventor: Carl W. Griffin, 100 Twin Acres, Fayetteville, N.C. 28305

[21] Appl. No.: 577,355

[22] Filed: May 14, 1975

[51] Int. Cl.² ............................................. B25H 1/12
[52] U.S. Cl. ................................. 144/285; 83/471.3; 83/928; 144/1 R; 296/24 R; 312/25
[58] Field of Search ............. 144/1 R, 1 A, 1 B, 1 C, 144/1 G, 1 H, 39, 41, 48, 285, 286 R, 286 A, 286 B; 83/928, 471.2, 471.3; 312/22, 25; 296/23 R, 24

[56] References Cited

U.S. PATENT DOCUMENTS

| 1,652,257 | 12/1927 | Stevenson | 312/25 UX |
| 2,358,446 | 9/1944 | Cause | 296/24 R |
| 2,505,658 | 4/1950 | Wilson | 144/285 |
| 2,674,130 | 4/1954 | Spychalla | 144/1 R X |
| 2,678,139 | 5/1954 | Gildersleeve | 296/24 R X |
| 3,068,038 | 12/1962 | Douglass, Jr. | 296/24 R |
| 3,149,651 | 9/1964 | Belrose | 83/928 |
| 3,492,042 | 1/1970 | Nachtigall, Jr. | 296/24 R |
| 3,628,578 | 12/1971 | Berg | 83/471.3 |
| 3,697,123 | 10/1972 | Gygrynuk | 296/24 R |

Primary Examiner—Harrison L. Hinson
Assistant Examiner—W. D. Bray
Attorney, Agent, or Firm—Mills & Coats

[57] ABSTRACT

In abstract, a preferred embodiment of this invention is a shop type composite trailer which can be folded to a compact size for transport and can be expanded during shop use. This trailer has an enclosure with shop type material processing equipment mounted therein. It also has means for removing the equipment from the enclosure while still attached to and supported by such enclosure. Additionally, it has supports for supporting the work material adjacent to the removed equipment.

9 Claims, 9 Drawing Figures

COMPOSITE SHOP TRAILER

This invention relates to vehicles and more particularly to towable type land vehicles for transporting and use during operation of shop type wood working equipment.

It has become common practice in the construction industry, whenever a house or building containing a substantial amount of wood is being built, to set up a radial saw with elongated lumber supporting benches on either side thereof. These benches serve the function not only to support the work piece while it is being cut but also to support the same at a comfortable height while the operator of the saw measures or otherwise marks the location to be cut.

Before use, not only must the saw be set up and leveled on the ground, but also the benches must be made steady and level. A considerable amount of effort is required for these two operations and also some type of covering must be constructed to prevent rain and the elements from damaging the highly precision cutting equipment. Also, on occasion, a jointer is desirable or necessary for smoothing cuts made by the saw or for other purposes. This additional equipment requires leveling and a steady footing as well as a protection cover.

Because of the time and effort required in setting up and taking down the radial saw at the job site, as well as the jointer if the same is used, necessitates planning in advance and a substantial amount of work to justify the same. For small jobs where a saw and/or jointer would be very helpful, the time required in properly setting up and taking down this equipment may well negate the advantages expected to be derived and thus the same would not be used.

Another disadvantage in using the semi-permanent saw or jointer installation is that because job sites are usually left unprotected at night and over weekends, all of the tools and other associated equipment must be daily removed from the job site and returned at the beginning of the next work day. This is not only laborious but time consuming which reduces the output of the worker who, in this case, is usually a skilled worker and, therefore, is paid at a higher than normal rate.

After much research and study into the above mentioned problems, the present invention has been developed to provide a radial saw, a jointer, or both that is readily transportable from job site to job site and can be set up and ready for operation in only a matter of minutes. All of the associated tools and equipment used by the skilled artisan operating the equipment can be readily and easily locked in the system of the present invention and is carried to and from the job site by, and at all times stays with, the saw or jointer equipment. Even on job sites requiring only a half-day or less of operation of either the saw or jointer can justify its use because of the portability of the present invention. The system can also be moved from job site to job site with a minimum size towing vehicle.

In view of the above, it is an object of the present invention to provide a portable, quickly set up and taken down, shop type wood working facility.

Another object of the present invention is to provide a complete radial saw facility including adjacent feeder benches which is easily portable and can be shifted from mobile to operative and back to mobile configurations in a matter of minutes.

Another object of the present invention is to provide a job site radial saw and jointer facility which is readily transportable.

Another object of the present invention is to provide, for use in connection with a radial saw, feeder benches which are simply and yet sturdily, and which are pivotable from an outward operative position to a folded portable position.

Another object of the present invention is to provide, in a portable arm saw facility, tool storage for all equipment required to operate such facility.

Another object of the present invention is to provide, in a portable job site type shop facility, a self-contained electrical system for all equipment requiring only a single power input.

Another object of the present invention is to provide a complete onsight portable shop facility including a radial saw, a jointer, feeder benches and all required accessories.

Another object of the present invention is to provide, in a trailer for transporting a radial saw, a slide out track for simplified positioning of said saw in operative position.

Another object of the present invention is to provide, in a trailer for transporting a radial saw, feeder benches which fold and retract adjacent the side of the trailer during transport and swing outwardly into operative position when in use.

Another object of the present invention is to provide, in a trailer for transporting a jointer, a slide out track for simplified locating of said jointer in operative position.

Other objects and advantages of the present invention will become apparent and obvious from a study of the following description and the accompanying drawings which are merely illustrative of such invention.

Figure 1:
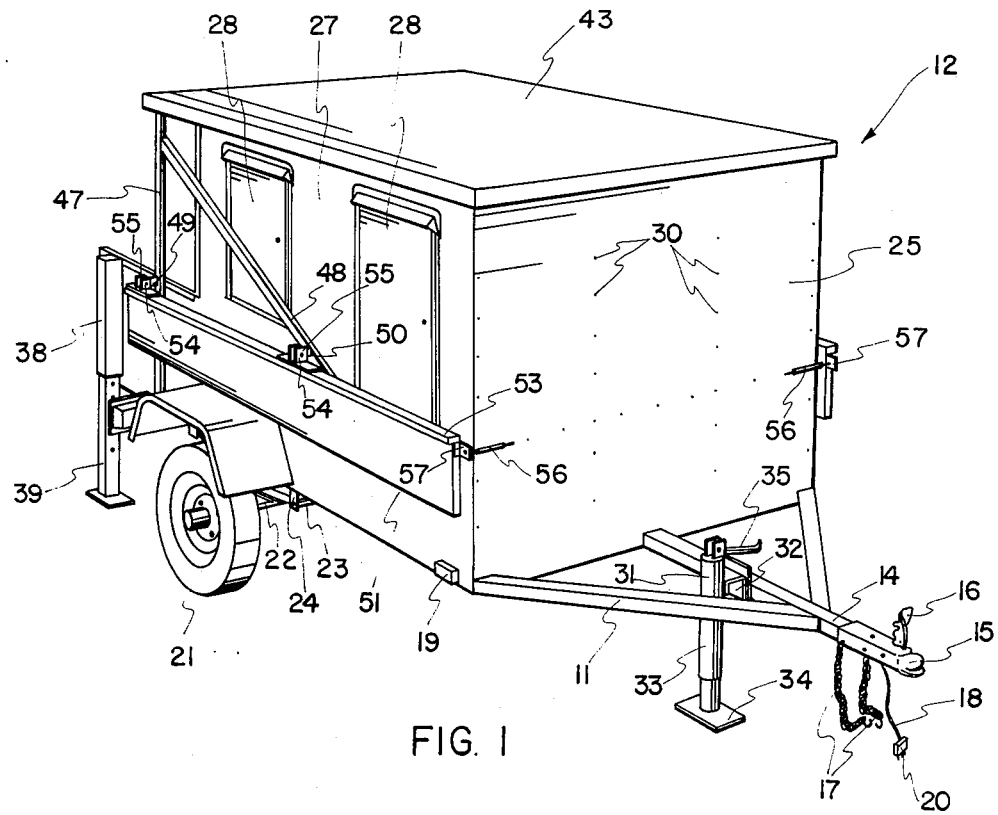
FIG. 1 is a front perspective view of the composite shop trailer of the present invention.

With further reference to the drawings, the present invention includes a standard trailer frame 11 and a body indicated generally at 12. The frame 11 extends outwardly in front of body 12 and terminates in a tongue 14. To the forward end of tongue 14 is secured a standard trailer hitch 15 with the usual locking lever 16. Also as standard equipment, safety chains 17 are provided as is the standard wiring harness 18 for the brake and tail lights 19 terminating in a standard connector 20 for plugging into the towing vehicle (not shown) electrical system.

Standard wheels 21 are rotatively mounted on axle 22 which by way of springs 23 and spring hangers 24 are connected to frame 11.

Body 12 includes a front portion 25 and side portions 26 and 27. To be more impervious to inclement weather, particularly when being towed, front portion 25 is preferably openless.

Each of the sides 26 and 27 have openings formed therein with doors 28 which hinge open in the standard manner and include lock latches 29. The interior of body 12 adjacent doors 28 is preferably partitioned off by walls 13 to create convenient storage areas and to prevent the tools, etc., stored therein from sliding about during transportation. These compartments can include bins, drawers, brackets, etc., as desired.

To support the tongue portion 14 of the trailer when the same is disconnected from its towing vehicle and to allow leveling of such trailer on the terrain upon which it is located, a standard screw jack 31 is secured to said tongue by bracket 32. This screw jack has on the end of its telescoping portion 33 an enlarged pad foot 34. To raise or lower the pad foot relative to tongue 14, handle 34 is manipulated clockwise or counterclockwise to operate the standard jack mechanism (not shown).

The lower portion of sides 26 and 27 extend outwardly in the rear portion, indicated generally at 36, of the trailer of the present invention. The floor 37 of the trailer also extends outwardly thus forming a bed like platform. To the outside of the rear portion of sides 26 and 27 is attached a vertically disposed channel 38. This channel is adapted to axially receive adjustable leg 39. The lower portion of each of these two legs terminates in a pad 40 as seen clearly in FIGS. 1 and 2.

A pair of opposed openings are provided in each channel 38 and are adapted to receive removable locking pin 41. This locking pin is in turn adapted to pass through channel 38 and openings provided in adjustable leg 39. Thus it can be seen that leg 39 can be moved upwardly or downwardly to the proper height, depending on the contour of the terrain on which the composite device of the present invention is sitting, and can be locked by aligning the channel and leg openings and inserting locking pin 41. During transport, the adjustable leg 39 would, of course, be raised to its uppermost position and locking pin 41 placed in the lower opening 42 as seen clearly in FIG. 2.

The top or roof portion 43 of the present invention can be reenforced in any conventional manner so that building materials such as lumber, plywood, sheet rock, etc., can be carried to the job site thereontop. Also carrying racks (not shown) can be provided to aid in the securing of the materials transported.

Figure 2:
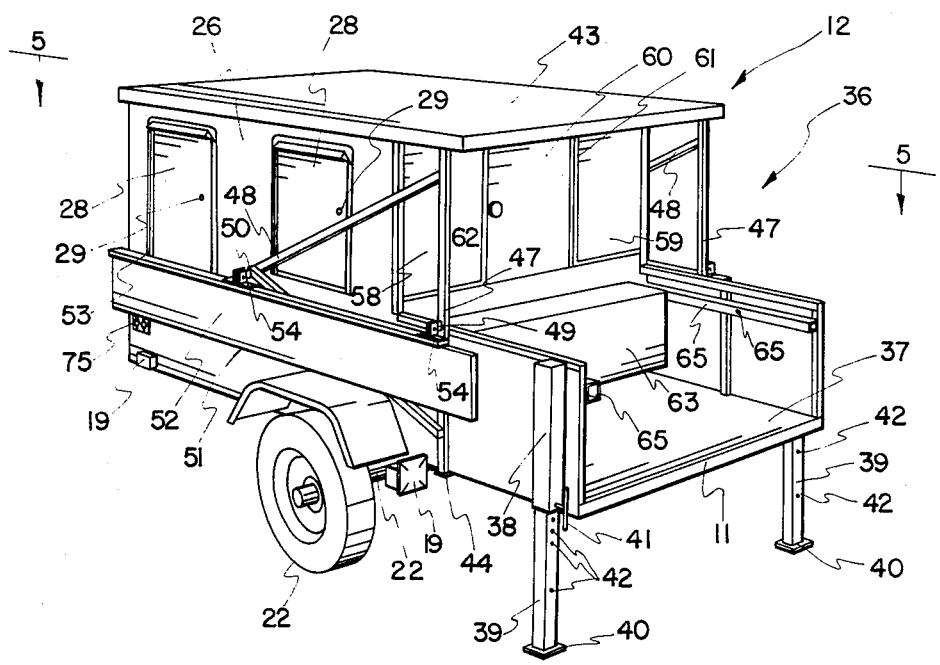
FIG. 2 is a rear perspective view of the same.

Roof portion 43 extends outwardly beyond the upper portion of sides 26 and 27 as seen clearly in FIG. 2. An opening 46' is provided in the bottom of the rear roof portion on each side thereof and a bracket 44 is attached in vertical alignment with each of said openings to the bottom of each of the sides 26 and 27. Bracket or flange 44 is adapted to pivotably receive pivot shaft 45 and the opening in the lower portion of the roof is adapted to pivotably receive pivot shaft 46, said shafts being disposed on either end of pivot member 47.

Pivot member 47 has fixedly attached thereto a V-shaped brace member 48. Generally in the center of pivot member 47 is a vertically disposed, outwardly projecting flange 49 having an opening in the middle thereof. At the apex of V-shaped brace member 50 is a vertically disposed, outwardly projecting flange which also has an opening in the central portion thereof.

A work material feeder bench 51 is provided on each side of body 12 and is in the form of a generally flat surface 52 with a material guiding back portion 53 fixedly secured thereto and disposed perpendicularly therefrom. Outwardly extending flanges 54 are fixedly secured to back portion 53 and so located that openings in such flanges line up with the openings in flanges 49 and 50. Pivot means such as pins 55 are provided which, when passed through each of the set of flanges 54 and their respective flanges 49 and 50, provide a hinge joint for feeder bench 51.

Figure 3:
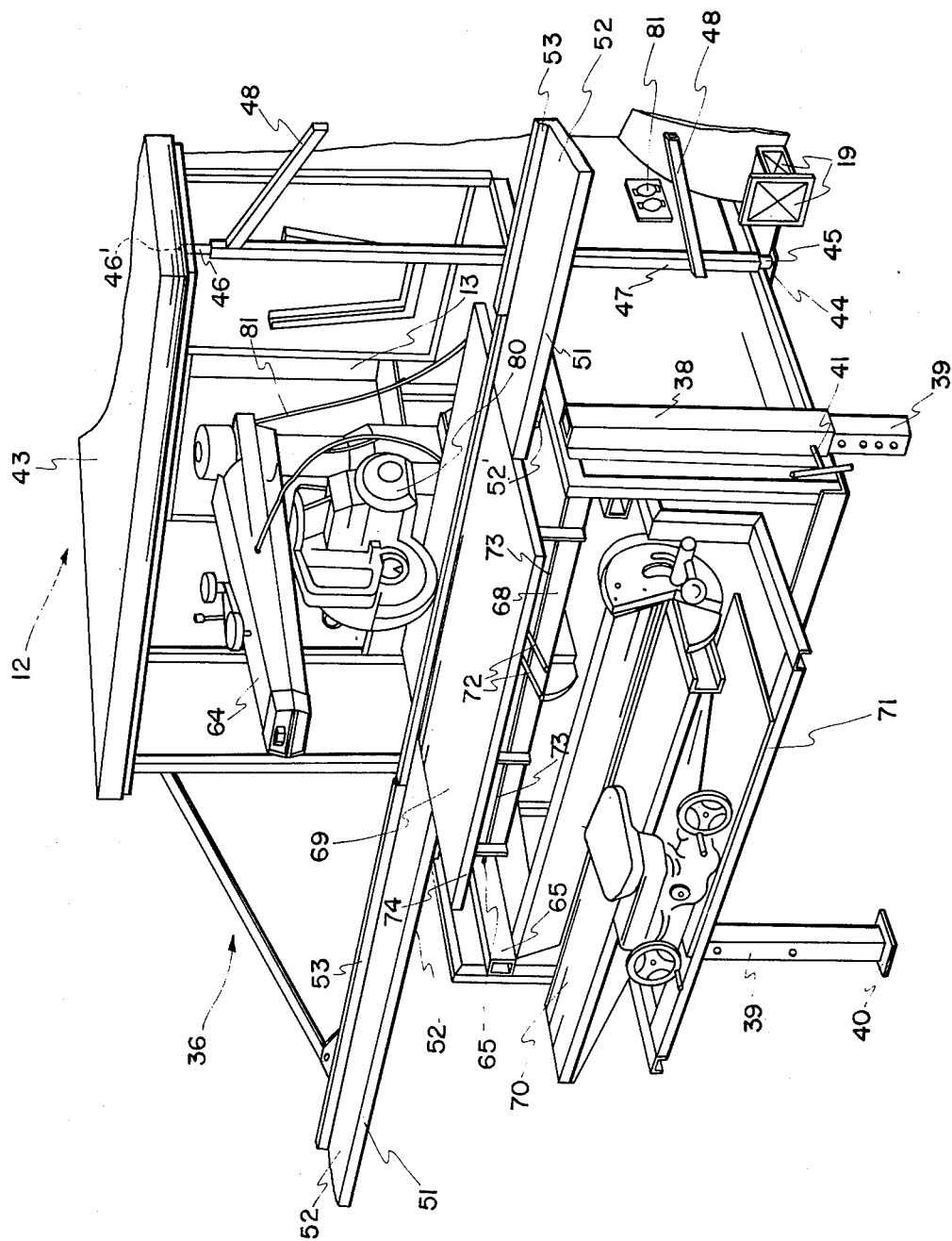
FIG. 3 is an enlarged fragmentary rear perspective view of the composite unit of the present invention showing the radial saw and jointer in operative positions.
Figure 4:
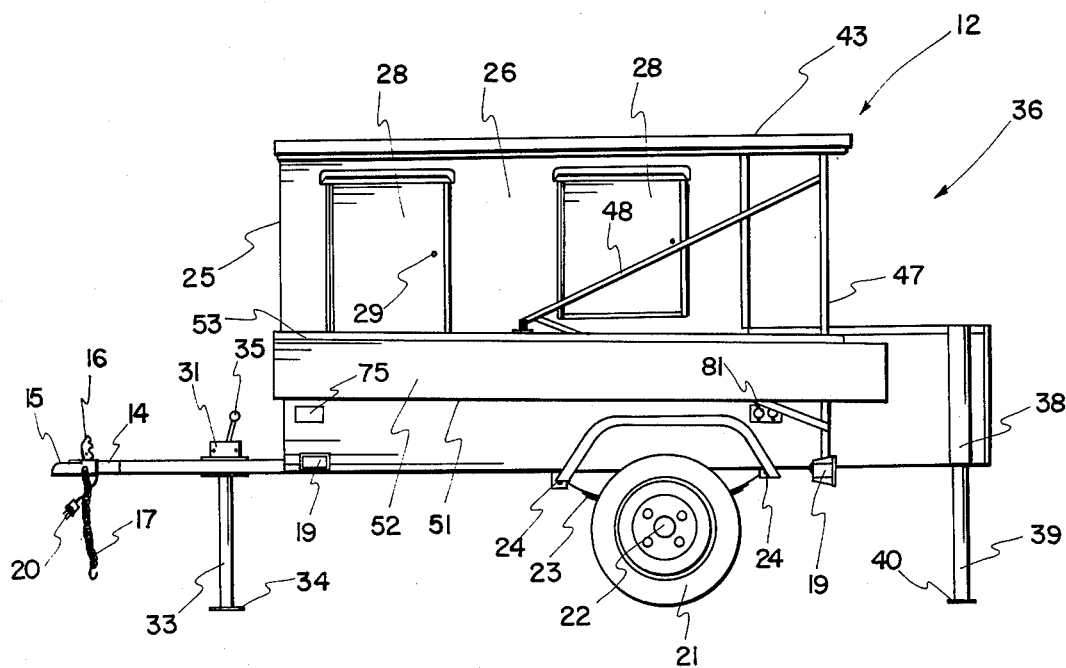
FIG. 4 is a side elevational view of said trailer.
Figure 5:
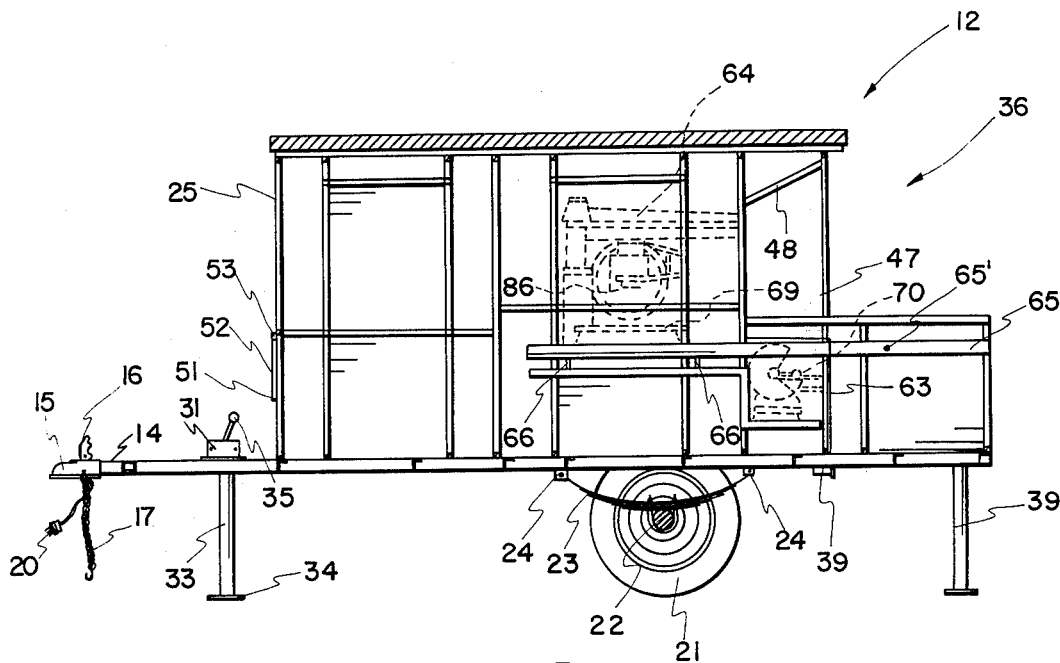
FIG. 5 is a section taken through lines 5—5 of FIG. 2.

From the above, it is obvious that bench 51 can be hingedly pivoted to a vertical position and swung back against the side of trailer body 12 during transport and can be pivoted to a horizontal position about pivot pins 55 and then swung about the axis of pivot member 47 into the use position shown in FIG. 3.

When the benches 51 are through being used, they can be swung around adjacent the side of body 12 and downwardly pivoted adjacent thereto in the position shown in FIGS. 1 and 2. To prevent any tendency to outwardly swing during transport, a securing means such as spring 56 can be provided which is attached at one end to front 25 and at its other end releasably to flange 57 as seen clearly in FIG. 1.

The rear of body 12 is composed of two fixed panels 58 and 59 and a door 60 which is hinged at 61. Lock 62 is provided for security purposes. Door 60 is adapted to pivot 180° from a closed position to an opened position. Thus, when in the opened position, such door lies out of the way juxtaposed to panel 59. A removable panel 63 covers the jointer (if the same is used) during transport and completes the rear configuration of body 12. This panel is preferably produced from sheet metal and can simply interlock so that when door 60 is closed and locked, the panel is fixedly held in place.

Figure 7:
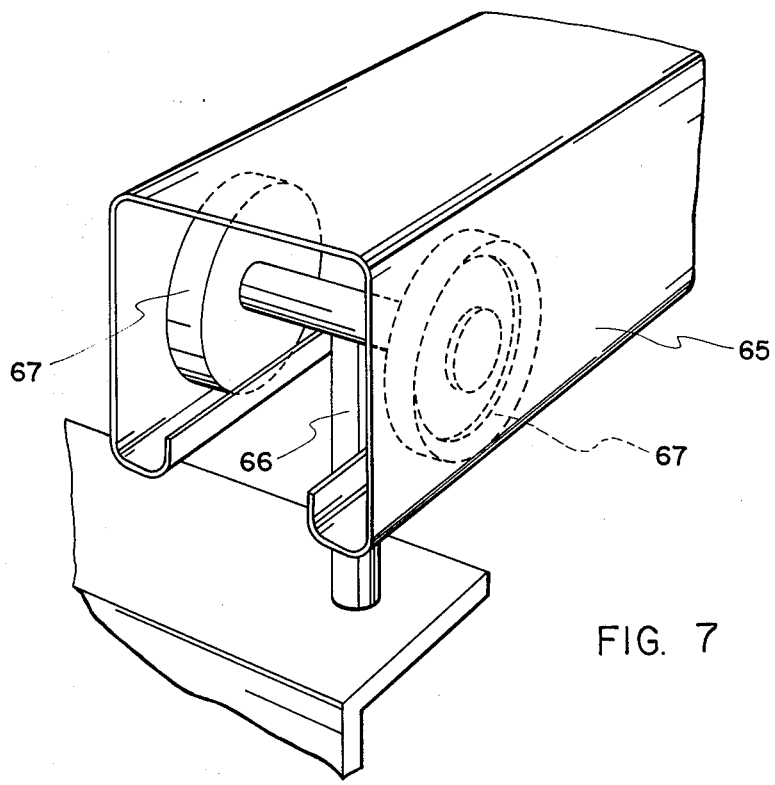
FIG. 7 is a cutaway fragmentary perspective of the roller carriage and track used to support the saw portion of the present invention.

Extending from the rear portion 36 of body 12 to a point interior of said body far enough to support radial saw 64 thereinside with door 60 closed, is a channel 65 of the barn track type. This channel is adapted to accommodate a carriage 66 having rollers 67 rotatively mounted thereon as seen clearly in FIG. 7. Carriage 66 is fixedly secured to the frame 68 of saw 64. Thus, it can be seen that said saw can move in and out of the enclosed body 12 through door 60. When said saw is in its rearwardmost position, the platen 69 will be juxtaposed to benches 51 when they are extended as seen in FIG. 3.

A jointer 70 is mounted on frame 71 which is suspended from roller carriages 66. This jointer is adapted to move along channel 65 as radial saw 64 is adapted to so move.

Although a single channel 65 is shown on each side of body 12, it is, of course, understood that a pair of channels could be used, one mounting radial saw 64 and one mounting jointer 70. It has been found, however, more convenient to have only the single channel system which is used for both units. The jointer, of course, can also be mounted on a floor supported track means if desired. In either case, both the radial saw and jointer move from a storage-transport position within body 12 to a location adjacent rear portion 36 for use. They then can be easily and readily moved back into the interior storage-transport location.

Handles 72 control elongated locking pins 73 which are biased outwardly by springs 74. By squeezing handles 72 together, pins 73 are disengaged from notches provided and the saw or jointer, as the case may be, can be moved along parallel channels 65. When, in either the outward, operative position or the inner, transport position, the handles are released, the pins engaged a notch provided thus locking the equipment in that desired location.

Figure 6:
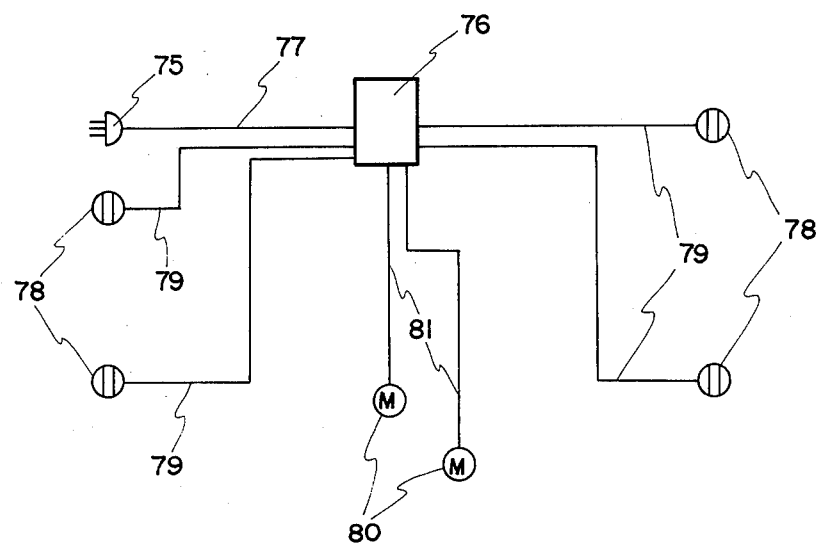
FIG. 6 is a schematic of the self-contained electrical power system of the present invention.

An electrical connector or inlet 75 preferably of the exterior or water proof type is provided. This connector furnishes power for the various equipment contained by the trailer of the present invention. The schematic shown in FIG. 6 discloses inlet 75 connected to a control panel and fuse box 76 by line 77. A plurality of convenience outlets 78 are provided and are connected to panel 76 by lines 79. The saw and jointer motors 80 are also connected to the control panel 76 through lines 81. It is, of course, understood that, depending on the size equipment to be used, inlet 75 can either be for 110 volts or 220 volts. If said inlet is for 220, the control panel would be so arranged that 110 volts would be delivered to part or all of the convenience outlets 78 while the motors 80 requiring 220 volts would receive the same. Also, ground lines would be included in the system but a detailed schematic, other than that disclosed in FIG. 6, is not deemed necessary since, in view of FIG. 6, an electrician skilled in the art could readily produce the same.

To use the system of the present invention, a tow vehicle (not shown) is connected to hitch 15. Locking lever 16 is then closed in the usual manner, safety chains 17 are secured and the trailer running light system is hooked up by way of connector 20. The adjustable legs 39 and the telescoping portion 33 of jack 31 are all moved into their uppermost or retracted position and the system of the present invention is ready to be towingly transported.

Once the job site is reached and the trailer is parked at the desired location, jack 31 is operated so that pad 34 engages the terrain under the trailer. The towing vehicle can then be disconnected and removed from the area. Legs 39 are then lowered to engage the adjacent terrain and are so adjusted that body 12 sits level. Locking pins 41 are inserted and the system is ready to be opened for operation.

Next, lock 62 is opened and door 60 hinged back juxtaposed to panel 59. With the door open, panel 63 can be removed and set to one side. Handles 72 on the radial saw are then squeezed together thus disengaging lock pins 73 against the bias of springs 74. The saw can now be rolled from its storage-transport position within body 12 rearwardly and outwardly along channels 65. Channel stop 65' is so located that when the same is engaged, the saw will be in its proper operative location. Handles 72 are then released allowing, through the bias of springs 74, locking pins 73 to engage their respective notches to securely lock and hold the saw from movement relative to the trailer body 12. The trailer body, of course, is firmly supported on the terrain thereunder by screw jack 31 and adjustable legs 39 thus assuring that saw 64 is stationary.

Once the saw is in the position hereinabove described, the bench securing springs 56 can be released and the work material feeder benches 51 hinged from their vertical, transport position to a generally horizontal position. The thus leveled benches are then swung 90° from a position adjacent sides 26 and 27, respectively, to their operative position, wing and wing, on either side of the rear portion 36 of body 12. These benches are so designed that when they are in the winged position, they smoothly abut the platen 69 of saw 64 with the work aligning back portion 53 adjacent a similar member located on said platen as illustrated in FIG. 3.

Blocks 52' on the side of each of the benches 51 opposite the flat work surface 52 are so located that when said benches are in the use position shown in FIG. 3, such blocks will lie juxtaposed to the interior rear side panel thus locking said benches from any movement other than hinging upwardly from the horizontal work position. Since the weight of the benches alone bias the same from this upward movement, the entire system is locked firmly in position.

If the jointer 70 is installed and needed, it can be moved outwardly as hereinabove described for the radial saw and locked into the position shown in FIG. 3. The same can then be used as necessary and when such use is completed, it can be slid back into body 12 as hereinafter described for said saw.

Once either the saw, the jointer or both are in operative position in the rear portion 36 of body 12, electrical power from an external source (not shown), such as a construction site utility outlet, can be plugged into inlet 75. As hereinabove mentioned, this inlet can be for either 110 volts or 220 volts depending on the requirements of the system of the present invention. In any case, power is thus plugged into the system through inlet 75 and through flexible lines 81, such power is transmitted to the operating motors. Additional power tools, lights, etc., can be plugged into the convenience outlets 78 and receive power from the external source via the present invention's electrical system.

Whenever use of the radial saw and/or jointer is complete, either for the day or at that job site, the feeder benches 51 can be pivoted upwardly to disengage locking blocks 52 so that such benches can be swung from their winged position to the folded position adjacent the sides of body 12. The benches are then pivoted downwardly to a generally vertical position and can be secured by retaining springs 56. Handles 72 can then be squeezed together to release locking pins 73 and the shop unit rolled back into the interior of body 12 along channels 65. When said unit reaches its innermost position and engages a stop similar to stop 65', the handles are released so that the locking pins can engage the notches provided to secure the unit. Panel 63 can then be replaced to the position shown in FIG. 2 and, when door 60 is closed and locked, the system is secured.

If it is only a work stoppage, the system can be left as described above until the next day and in just a few minutes reopen as earlier described and be ready for use. If on the other hand, the work is completed at that particular job site, or for other reasons, it is necessary to move the trailer, all that is required is that the legs 39 be moved to their retracted positions and the trailer hitch 15 connected to towing vehicle. Screw jack 31 can then be retracted and the system is ready for transport and use as previously described.

From the above, it can be seen that the present invention has the advantages of providing a readily towable easily converted, composite shop unit with all the facilities of standard field units and yet having the versatility of being readily set up for operation and taken down for transport. The present invention also has the advantage of being relatively inexpensive to construct, being able to transport all tools and other equipment necessary for operation of the system in separate storage compartments, and yet has all of the advantages of the semi-permanent facilities heretofore used.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A transportable, shop type composite system comprising: an enclosed structure; shop type material processing equipment; means for removably attaching and supporting said equipment within said enclosure; means enabling removal of said equipment from said enclosure while maintaining the attachment of said supporting means by such enclosure; work material support means in the form of a feeder bench so mounted on the exterior of said enclosure as to fold to a vertical position flatly against said exterior during transport and to fold to a generally horizontal position and swing perpendicular to said exterior in its operative position adjacent said equipment when the same is in removed operative position; means for attaching said material support means in aligned position adjacent said removed equipment; and means for transporting said enclosure when said equipment is contained therewithin.

2. The system of claim 1 wherein said enclosure includes an electrical distribution system operatively disposed therein.

3. The system of claim 1 wherein the shop type material processing equipment is a radial saw.

4. The system of claim 1 wherein the shop type material processing equipment is a jointer.

5. The system of claim 1 wherein the shop type material processing equipment is a radial saw and a jointer.

6. The system of claim 1 wherein the means for removably mounting said equipment within said enclosure is a combination barn track type channel and roller means associated therewith.

7. The system of claim 1 wherein the work material support means is at least one material feeder type bench.

8. The system of claim 1 wherein the means for transporting said enclosure is a trailer type frame means.

9. The system of claim 1 wherein means for adjustably leveling said enclosure are provided.

* * * * *